(121.)

AMOS RANK.

Improvement in Platform Bridge for Railway Cars.

No. 4,708. Reissued Jan. 9, 1872.

*Witnesses:-*
W. H. Rowe,
Jos. A. Seyton.

Amos Rank
by his Atty
Wm. D. Baldwin

A.M. PHOTO-LITHOGRAPHIC CO. N.Y. (OSBORNE'S PROCESS.)

UNITED STATES PATENT OFFICE.

AMOS RANK, OF SALEM, OHIO.

IMPROVEMENT IN PLATFORM-BRIDGES FOR RAILWAY CARS.

Specification forming part of Letters Patent No. 77,321, dated April 28, 1868; reissue No. 4,708, dated January 9, 1872.

*To all whom it may concern:*

Be it known that I, AMOS RANK, of Salem, Columbiana county, Ohio, have invented an Improved Platform-Bridge for Railway Cars, of which the following is a specification:

The object of my invention is to cover the space between the platform of two adjacent railway cars, when coupled together, by a bridge, which shall be, practically, inflexible under the weight of passengers passing from car to car, and yet be capable of accommodating itself freely to the vertical, longitudinal, and lateral oscillations of the cars when in motion, as well as of being readily removed or replaced when the cars are coupled or uncoupled.

Figure 1:
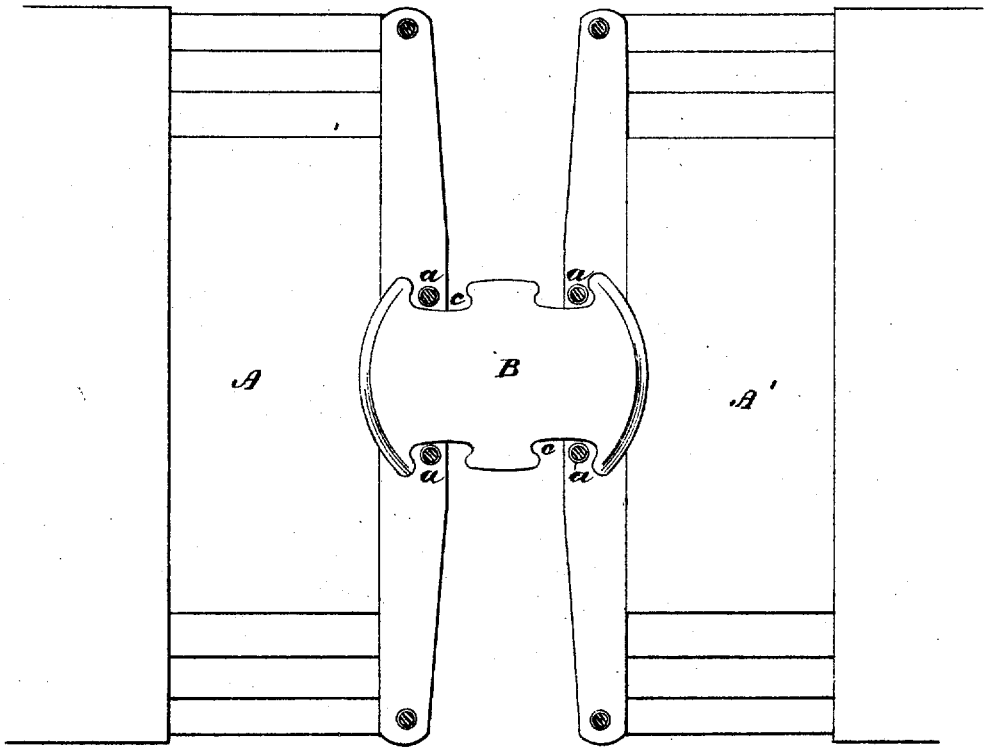
Figure 2:
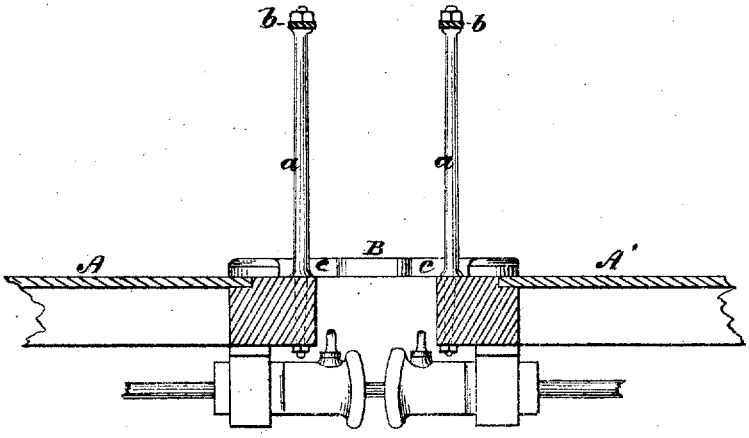

In the accompanying drawing, Figure 1 represents a plan view of the ends of two railway passenger-cars with a bridge embodying my invention. Fig. 2 represents a side elevation with the platforms in section.

The platforms A A′ are provided with standards *a* to support the ordinary transverse hand-rails *b* at their ends, as usual. The cars are coupled together in any of the ordinary well-known ways. A bridge, B, covers the space between the ends of the platforms above the couplings, its length being such as to permit its ends to overlap the platforms far enough to prevent it from falling when the cars are drawn apart to the greatest distance permitted by the couplings. This bridge may be made in one piece of cast metal, or of wrought-metal bars properly welded or riveted together, or of an open grating of strap-iron secured to a proper frame, or it may be made of wood. Near each end of the bridge longitudinal recesses *c* are formed, in which recesses the uprights *a* are received when the bridge is in position, thus holding the bridge securely, while leaving it free to move with the oscillations of the cars. The bridge can readily be removed or replaced by turning it up sidewise until the recesses clear the standards. The ends of the bridge are, by preference, rounded or beveled so as to prevent stumbling.

By this means passengers can pass safely from car to car while the train is in motion.

I am aware that sliding bridges and extensible lazy-tongs bridges have also been used; but these plans have not gone into general use, being expensive, liable to get out of order, and liable to yield under the weight of passengers.

I claim as my invention—

1. A railway platform-bridge, constructed substantially as hereinbefore set forth, with recesses at one end to form a free joint between the bridge and car.

2. A railway platform-bridge having recesses or their equivalents in its side edges, and adapted to be applied between coupled railway cars, substantially as described.

3. The combination of the hand-rail standards with the recesses in the bridge, substantially as hereinbefore set forth, to hold it securely, and yet allow it free play, as well as to facilitate its removal or replacement.

4. The bridge, constructed as set forth, with beveled ends to prevent tripping the passengers.

Witnesses: AMOS RANK.

WILLIAM H. KIDD.

WILLIS CADWALLADER. (122)